(12) United States Patent
Guionnet et al.

(10) Patent No.: US 8,966,239 B2
(45) Date of Patent: Feb. 24, 2015

(54) DIGITAL CONTENT ACCESS CONTROL HAVING IMPROVED TRANSMISSION BANDWIDTH

(75) Inventors: Chantal Guionnet, Cesson-Sevigne (FR); Pierre Fevrier, St. Sulpice la Foret (FR)

(73) Assignee: Orange, Paris (FR)

( * ) Notice: Subject to any disclaimer, the term of this patent is extended or adjusted under 35 U.S.C. 154(b) by 379 days.

(21) Appl. No.: 12/823,250

(22) Filed: Jun. 25, 2010

(65) Prior Publication Data

US 2010/0332819 A1 Dec. 30, 2010

(30) Foreign Application Priority Data

Jun. 26, 2009 (FR) ..................... 09 54372

(51) Int. Cl.
| | | |
|---|---|---|
| *H04L 29/06* | (2006.01) | |
| *G07F 7/00* | (2006.01) | |
| *H04N 7/167* | (2011.01) | |
| *H04N 21/2543* | (2011.01) | |
| *H04N 21/266* | (2011.01) | |
| *H04N 21/418* | (2011.01) | |
| *H04N 21/4405* | (2011.01) | |
| *H04N 21/4627* | (2011.01) | |

(52) U.S. Cl.
CPC ....... *H04N 7/1675* (2013.01); *H04N 21/25435* (2013.01); *H04N 21/26606* (2013.01); *H04N 21/4181* (2013.01); *H04N 21/4405* (2013.01); *H04N 21/4627* (2013.01)
USPC .................. 713/150; 726/1; 726/25; 380/239

(58) Field of Classification Search
CPC ............ H04N 7/1675; H04N 21/4627; H04N 21/4405; H04N 21/25435; H04N 21/4181; H04N 21/26606
USPC ................ 713/150, 155, 168–171; 725/1, 25; 380/239
See application file for complete search history.

(56) References Cited

U.S. PATENT DOCUMENTS

| | | | | |
|---|---|---|---|---|
| 2005/0108563 | A1* | 5/2005 | Becker et al. ................. | 713/200 |
| 2005/0108763 | A1* | 5/2005 | Baran et al. .................... | 725/87 |
| 2005/0144646 | A1* | 6/2005 | Lecrom et al. ................ | 725/100 |
| 2005/0198680 | A1* | 9/2005 | Baran et al. .................... | 725/88 |
| 2005/0259813 | A1* | 11/2005 | Wasilewski et al. ............ | 380/28 |
| 2006/0047957 | A1* | 3/2006 | Helms et al. ................... | 713/165 |
| 2006/0184796 | A1* | 8/2006 | Fahrny .......................... | 713/176 |
| 2006/0200412 | A1* | 9/2006 | Fahrny et al. .................. | 705/50 |
| 2006/0271950 | A1* | 11/2006 | Kim et al. ...................... | 725/31 |

(Continued)

FOREIGN PATENT DOCUMENTS

| | | | |
|---|---|---|---|
| EP | 2 063 638 A1 | 5/2009 | |
| FR | 2 843 468 A1 | 2/2004 | |

*Primary Examiner* — Haresh N Patel
(74) *Attorney, Agent, or Firm* — Drinker Biddle & Reath LLP

(57) ABSTRACT

Control of access to at least one digital content is managed as a function of at least one access criterion. The digital content is transmitted to at least one terminal in the form a data stream. The access criterion is stored in the terminal as a function of an identifier. The terminal receives the data stream in association with a control message indicating the identifier. It then retrieves the stored access criterion as a function of the identifier received in the control message. Finally, it verifies whether the stored access criterion is satisfied in order, where appropriate, to authorize access to the content.

7 Claims, 3 Drawing Sheets

(56) References Cited

U.S. PATENT DOCUMENTS

| | | | |
|---|---|---|---|
| 2006/0294512 A1* | 12/2006 | Seiden | 717/168 |
| 2007/0160208 A1* | 7/2007 | MacLean et al. | 380/210 |
| 2007/0242829 A1* | 10/2007 | Pedlow, Jr. | 380/277 |
| 2007/0286420 A1* | 12/2007 | MacLean et al. | 380/201 |
| 2007/0294170 A1* | 12/2007 | Vantalon et al. | 705/50 |
| 2008/0022411 A1* | 1/2008 | Wendling et al. | 726/27 |
| 2008/0144822 A1* | 6/2008 | Wendling et al. | 380/239 |
| 2008/0249944 A1* | 10/2008 | Song et al. | 705/51 |
| 2008/0301437 A1* | 12/2008 | Chevallier et al. | 713/155 |
| 2009/0222676 A1* | 9/2009 | Becq et al. | 713/193 |
| 2009/0254930 A1* | 10/2009 | Lo et al. | 725/2 |
| 2009/0288151 A1* | 11/2009 | Agahi | 726/5 |
| 2009/0323949 A1* | 12/2009 | Chieze et al. | 380/239 |
| 2010/0268964 A1* | 10/2010 | Carrel et al. | 713/189 |

* cited by examiner

DIGITAL CONTENT ACCESS CONTROL HAVING IMPROVED TRANSMISSION BANDWIDTH

CROSS-REFERENCE TO RELATED PATENT APPLICATION

This application claims the benefit of French Patent Application No. 09 54372, filed on Jun. 26, 2009, in the French Institute of Industrial Property, the entire content of which is incorporated herein by reference.

FIELD OF THE INVENTION

Various embodiments of the invention relate to the field of transmitting multimedia content in transmission networks and more particularly to controlling access to such multimedia content.

BACKGROUND

Multimedia content transmission networks may be used in particular for pay-per-view television applications.

In transmission networks of this type, multimedia content are transmitted in encrypted form and can be reproduced by a receiver terminal only subject to certain conditions. Access to such multimedia content is generally controlled as a function of access entitlements and access criteria.

In such a context, a terminal receives its entitlements via a unique message that is sent to it individually. Such a message may be an initial entitlements message of the Entitlement Management Message (EMM) type. A message of this type is a personalized message that can be sent to a single subscriber or to a group of subscribers.

Then each terminal of the transmission network may optionally access certain digital content, as a function of its particular entitlements. Firstly, the digital content is transmitted in encrypted form using an encryption key (or control word (CW)) and, secondly, the encryption key is transmitted in a message synchronized with transmission of the digital content. Thus in order to access the digital content it is first necessary to decrypt the encryption key associated with it and that is received in an access control message, for example a message of the Entitlement Control Message (ECM) type, synchronized with a data stream transporting the digital content. This first decryption may be effected if the terminal already has in its possession an operating key enabling it to decrypt the digital content. This operating key is included in the entitlements that the terminal has received via the EMM-type message. Consequently, if the entitlements of the terminal authorize it to decrypt the encryption key received in association with the digital content using the operating key, it is then in a position to decrypt the digital content.

In the above context, access control is based on access entitlements assigned to each terminal.

Moreover, for some applications, or in some access control systems, in addition to these access entitlements, there is also provision for controlling access to a digital content on the basis of access criteria. Satisfying those access criteria may, for example, correspond to a specific subscription being present and valid or an account of the user of the terminal being sufficiently in credit to be able to pay for access to content the cost of which, or the amount to be debited, constitutes the access criterion.

Thus a terminal may be authorized to access a digital content if firstly its entitlements enable it to decrypt the received digital content and secondly the criteria for access to that digital content are satisfied. These access criteria are transmitted in messages of the ECM type synchronously with the corresponding data stream. This synchronization is required in a one-to-many communications context, i.e., communication from one source to a plurality of receivers, for example in broadcast or multicast mode.

In this context, the access entitlements transmitted in the EMM messages may be individualized for each subscriber while the access criteria transmitted in ECM messages in general broadcast mode are common to all subscribers.

FIG. 1 shows a prior art system for broadcasting digital content with controlled access.

Such a system includes one or more access entitlement management entities 11, a digital content transmission entity 14, and terminals 12 and 15. The entitlements management entity 11 sends the terminal 12 an EMM initial entitlements message 101 to send it its own entitlements A and sends the terminal 15 an EMM initial entitlements message 102 to send it its own entitlements B.

The transmission entity 14 then uses the general broadcast mode to broadcast (104) a digital content to the terminals 12 and 15 of the system. Synchronously with this general broadcast, entitlement control messages (ECM) 110 are transmitted in the same general broadcast. These messages indicate access criteria common to all the general broadcast destination terminals.

SUMMARY

A first embodiment of the invention provides a method of managing control of access to at least one digital content as a function of at least one access criterion, said digital content being transmitted to at least one terminal in the form of a data stream, wherein said access criterion is stored in the terminal as a function of an identifier, said method including the following steps executed in said terminal:

a) receiving the data stream in association with a message indicating said identifier;

b) recovering the stored access criterion as a function of the identifier received in the control message; and c) verifying whether the stored access criterion is satisfied in order, where appropriate, to authorize access to the content.

A "terminal" means any type of terminal adapted to receive a data stream corresponding to a transmitted digital content. Such a terminal may be television set, a computer, a mobile telephone, etc.

"Access criteria" are any criteria that the terminal may take into account to authorize or to bar access to a received digital content as a function of the individual entitlements of the terminal. One particular access criterion of this kind is the type of subscription. Making a digital content accessible only by terminals that have taken out a specific subscription associated with that digital content may be envisaged. Imposing a charge to be paid by each terminal to access a digital content may also be envisaged, for example in pay-per-view (PPV) type television applications. In this case, a terminal satisfies the access criterion if its credit exceeds the cost of accessing the digital content. By way of the present features, it is possible for the cost of access to a digital content to differ as function of the terminal concerned. For example, it might be desirable for a terminal that is a large-scale consumer of digital content to pay a lower price to access a digital content. It is also possible to apply an implementation of various embodiments of the invention to effecting parental control or control based on a geographical address, and thus to filter certain content for certain terminals.

"Digital content" is any content that may be transmitted via a transmission network, such as an audio content, a video content or an audiovisual or more generally multimedia content.

Thus it is easy to personalize the access criteria, offering great flexibility in terms of offers to provide digital content.

The invention is not limited in any way with regard to the type of transmission used to transmit the data stream. General broadcasting of the data stream may be envisaged, for example. In this situation, an implementation of the invention is simple to use in a prior art digital content access control system.

By way of these features, it is possible to send a terminal in a digital content transmission network access criteria that are specific to it, at the same time as optimizing use of the bandwidth in the transmission network used. It should be noted that only an identifier is transmitted in association with the data stream, and no access criteria, which might occupy more bandwidth, all the more so if it is required to personalize the access criteria in a general broadcast context. This aspect is all the more advantageous in that the message concerned is often repeated. This is the situation in particular if the message concerned is a message of the ECM type also transporting control words, as in a live TV broadcasting context, where the control words must be modified regularly. The messages concerned are then repeated frequently, and the fact that they are shorter enables a significant saving in bandwidth.

Furthermore, the transmission of a simple identifier, which may be common to all the terminals of the network for a given digital content, has the advantage that it makes it possible to personalize the access criteria for each terminal, since this identifier points to the access criteria stored in each terminal, which access criteria may be different for different terminals of the network. The access criteria are thus personalized while at the same time the occupancy of the bandwidth of the network is reduced.

Here there is provision for storing an access criterion or a list of access criteria in the terminal in association with an identifier. This identifier makes it possible in each terminal to point to the stored access criteria specific to each terminal.

Accordingly, by transmitting this identifier in association with the data stream, it is possible to indicate to the terminal access criteria that are specific to it for accessing the digital content that it receives, whether the identifier is transmitted in general broadcast mode or in multicast mode. The same identifier can then be transmitted to a group of terminals or to all the terminals of the network, at the same time as being associated in the terminals themselves with access criteria specific to each terminal.

In one embodiment of the invention, only an identifier is transmitted in a message associated with the data stream, instead of transmitting a list of access criteria. Consequently, the messages associated with transmitting the data stream are themselves smaller, which makes it possible to optimize the use of bandwidth in the transmission network. By proceeding in this way, it is possible to manage the access criteria on an individualized basis for each terminal, at the same time as reducing congestion of the bandwidth in the transmission network.

The identifier associated with an access criterion or a list of access criteria specific to a terminal may correspond to a given digital data stream. When the identifier is transmitted synchronously with the data stream in general broadcast mode, all the terminals seeking to access that digital content receive the same identifier in messages associated with the data stream. However, the received common identifier is not necessarily associated with the same access criteria for each of the terminals. Thus even if the general broadcast mode is used, the access criteria may be personalized for each terminal.

Thus in one embodiment of the invention the identifiers may be transmitted synchronously with the data stream in messages of the ECM type.

There is no limitation on the ways or elements used by the terminal to store the access criterion or criteria as a function of an identifier. In particular, the terminal may retrieve this association of an identifier with access criteria from a storage medium such as a USB key, for example, or by receiving an initial message before receiving the data stream transporting the digital content.

Thus in one embodiment of the invention, the method further includes the following steps before the step a):

i) receiving an initial message indicating at least the access criterion and the identifier associated with said access criterion; and ii) storing said access criterion in association with said identifier.

An initial message of this kind may be transmitted individually to the terminal. Thus it may be transmitted via an initial entitlements message of the EMM type.

In one embodiment of the invention, the digital content is transmitted in encrypted form and the control message, which indicates the identifier, further indicates an encryption key of said digital content.

Here the control message may be a message of the ECM type. It may be sent regularly to guarantee renewal of the encryption key, modified for security reasons. It may furthermore be sent more frequently, even during a period in which the digital content encryption key has not been modified. Repeating control messages in this way makes it possible to reduce the waiting time of the terminal user on requesting a new digital content. When the digital content is a television program, this repeated sending of control messages indicating the same encryption key makes it possible to reduce the waiting time when changing the TV channel (channel zapping).

Another embodiment of the invention provides a method of managing control of access to at least one digital content as a function of at least one access criterion, said digital content being transmitted to at least one terminal in the form of the data stream, in which method said access criterion is stored in the terminal as a function of an identifier, said method including the following step executed in an access control management entity:

i) transmitting at least one control message indicating said identifier in association with the data stream.

Here a terminal stores an association between an identifier and one or more access criteria. Thus the access control management entity transmits in association with the data stream corresponding to the digital content concerned only the identifier. Thereafter the terminal is in a position to retrieve for itself the access criteria that must be satisfied to access that digital content. The access criteria are considered to be satisfied in accordance with access entitlements received beforehand. The control message indicating this identifier may be a message of the ECM type.

In one embodiment of the invention, the following step is effected before the step of transmitting at least one control message: transmitting to the terminal an initial message indicating an identifier associated with said access criterion.

In one embodiment of the invention, the initial message is a message of the EMM type that may be sent individually to a terminal. There may be provision either for grouping this identifier and criteria associated with the access entitlements in the same message of the EMM type or for transmitting two separate messages for this purpose. Be this as it may, these messages may be sent to a single terminal or to a group of terminals.

Accordingly, on reception of an initial message, the terminal stores the association between the identifier and the access criteria. It suffices thereafter to transmit only the identifier in grouped manner to a plurality of terminals, in either multicast mode or general broadcast mode. A single identifier may advantageously be used for each data stream transmitted, each identifier corresponding to own criteria of terminals, in respective memories.

In one embodiment of the invention, the digital content is transmitted in encrypted form and the control message further indicates a digital content encryption key. This message may be transmitted regularly, to make it possible to reduce the time for changing access to a digital content. When there is provision for modifying the encryption key, this control message is transmitted synchronously with the data stream.

Another embodiment of the invention provides a terminal including elements adapted to implement a method of an above-noted embodiment of the invention of managing access control.

Another embodiment of the invention provides an access control management entity including elements adapted to implement a method of access control management of an above-noted embodiment of the invention.

This control management entity may also be responsible for managing the assignment of access entitlements specific to each terminal.

Another embodiment of the invention provides an entity for transmitting digital content with access control including elements adapted to implement a method of an above-noted embodiment of the invention of managing access control.

In one embodiment, the transmission entity and the control management entity are colocated.

Another embodiment of the invention provides a system for controlling access to a digital content including an access control management entity of an above-noted embodiment of the invention, a digital content transmission entity of an above-noted embodiment of the invention, and at least one terminal of an above-noted embodiment of the invention.

Another embodiment of the invention provides a non-transitory computer program product, comprising a computer usable medium having a computer readable program code embodied therein, said computer readable program code adapted to be executed to implement one or more of the above-noted embodiments.

Another embodiment of the invention provides a device for sending a message for controlling access to a digital content as a function of at least one access criterion, said digital content being transmitted to at least one terminal in the form of a data stream and said control message indicating an identifier relating to the data stream, said identifier being associated with said access criterion.

BRIEF DESCRIPTION OF THE DRAWINGS

Other features and advantages become apparent in the following detailed description given with reference to the appended drawings in which.

DETAILED DESCRIPTION

References that are identical from one figure to another designate identical or similar objects.

Figure 1:
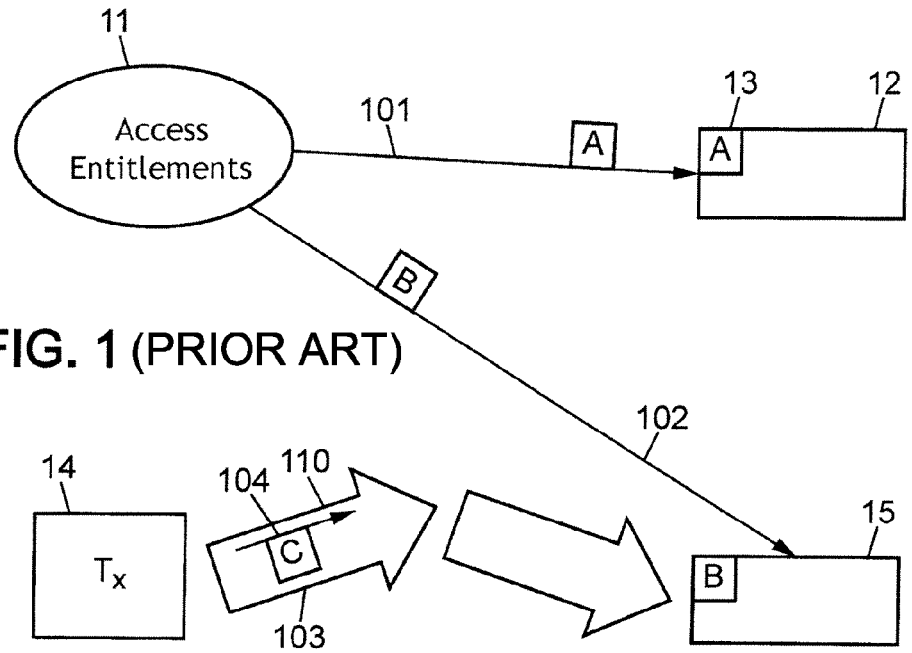
FIG. 1, already described, shows a prior art access control system.
Figure 2:
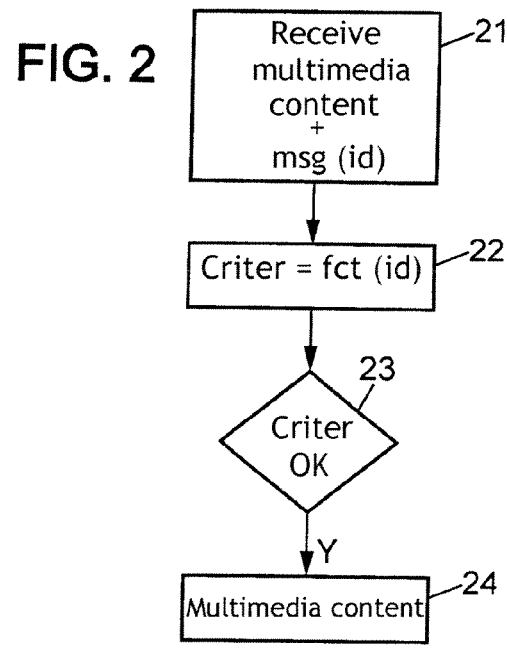
FIG. 2 shows the main steps of an access control management method of one embodiment of the invention.

FIG. 2 shows the main steps of a control management method of one embodiment of the invention in a terminal of a system with controlled access.

A digital content, which may be a multimedia content, is transmitted via a transmission network to at least one terminal in the form of a data stream. There is no limitation as to the transmission network used to transmit the digital content.

In one particular embodiment that is in no way limiting on the invention, the digital content are television programs transmitted live (i.e., in real time), the transmission network is the Internet, and the terminal includes a TV decoder also known as a set top box (STB).

One or more access criteria are stored in the terminal beforehand in association with an identifier. There may be provision for making an identifier correspond to one digital content or a plurality of digital content. This aspect advantageously remains flexible.

In the terminal, in a step 21, the digital content is received in the form of an encrypted data stream associated with a control message that indicates an identifier.

Then, in a step 22, the stored access criterion or criteria is or are retrieved as a function of the identifier received in the message. Then, in a step 23, whether the access criterion or criteria is or are satisfied is checked, based on an analysis of the entitlements present. Finally, in a step 24, if the access criterion or criteria is or are satisfied, the decision is made to access the digital content received in the data stream.

In an access control system of one embodiment of the invention, the data stream is transmitted in general broadcast mode to all terminals and the associated control message is transmitted synchronously with that data stream. Thus the identifier relates to a digital content. The access criteria stored beforehand in each terminal may advantageously be specific to each terminal.

A control message may be a message of the ECM type and thus be transmitted synchronously with the digital content. It may therefore indicate, in addition to the identifier, i.e., a pointer to access criteria specific to each terminal, the encryption key associated with the digital content transmitted in encrypted form.

An access control management system may include an access control management entity responsible for transmitting to each terminal individually or in grouped manner an association between an identifier and access criteria and a stream transmission entity that is responsible for broadcasting the digital content in the form of a data stream with which is synchronized a control message that indicates in particular the identifier corresponding to that data stream. This control message may advantageously be repeated over time during broadcasting of the data stream.

Figure 3:
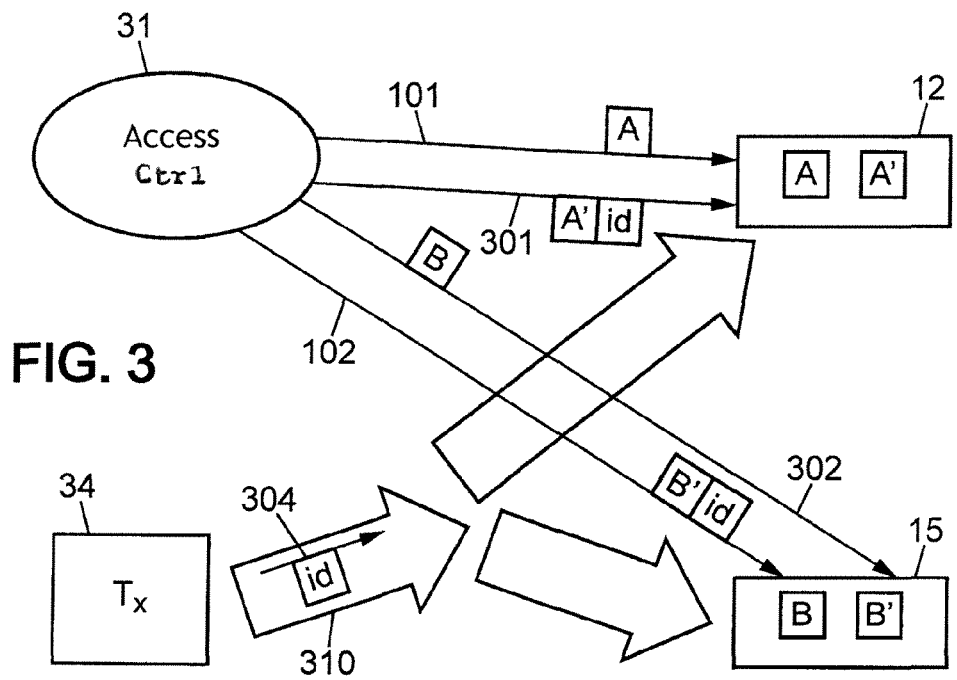
FIG. 3 shows an access control system of one embodiment of the invention.

FIG. 3 shows a system of one embodiment of the invention for controlling access to a digital content.

In one embodiment of the invention, an access control system of this type includes an entity 34 for transmitting digital content in the form of data streams over a transmission network.

It further includes an access control management entity 31 for each of the user terminals 12 and 15 of the system. The access entitlements may be a given type of subscription for a given period, a booking for a particular session, a plurality of tokens for localized impulse purchases, a decryption key, etc.

This access control management entity 31 is adapted to transmit its respective access entitlements to each of the terminals. To this end, it sends messages 101 and 102 indicating the access entitlements of the terminal 12 and the terminal 15, respectively.

These messages 101 and 102 may be messages of the EMM type. Thus the initial entitlements message 101 sent to the terminal 12 indicates the access entitlements A of the terminal 12 and the entitlements message 102 sent to the terminal 15 indicates the access entitlements B of the terminal 15. These access entitlements A and B are stored in the respective terminals.

In order for terminals using this access control system to receive their access criteria and the associated identifier, using either the same messages 101 and 102 or other messages of the same type may be envisaged. There may also be provision for this association of an identifier with the access criteria to be obtained in a terminal by any appropriate way, for example by physical transfer of data via a key of storage.

In the example shown in FIG. 3, respective access criteria A' and B' of the terminals 12 and 15 are transmitted via respective initial messages 301 and 302. A plurality of identifiers corresponding to a plurality of digital content or a plurality of access types may be transmitted in the same initial message or in respective separate initial messages.

Whichever method is used, at a certain stage of the control management process, the terminals store, for example in the memory of a smart card, both the respective access entitlements A or B, and also the respective access criteria A' or B' associated with an identifier.

When a terminal requests a certain digital content, for example a television program or film, it receives the digital content broadcast by the transmission entity in the form of a data stream 310. This data stream is associated with a control message that indicates an identifier of the data stream. Accordingly, on reception of this identifier, each terminal retrieves its own stored access criteria.

Access to the digital content is then a function of the access criteria and access entitlements.

In one application example, a terminal of an access control system of one embodiment of the invention requests to receive a television channel. Access to the program broadcast on that channel is required to be possible only with a given subscription for certain terminals and a subscription chosen from a list of subscriptions for other terminals (these are the access criteria). In this situation, the data stream that transmits the digital content corresponding to the television program is associated with a stream of control messages each indicating a single associated identifier. If the terminal has previously received this identifier and the associated criteria, to enable the terminal to access the corresponding digital content those personalized criteria are applied and are verified against the personal entitlements of each terminal.

Another example of application is to a pay-per-view (PPV) television service. A terminal of an access control system of one embodiment of the invention requests to receive a film, for example. Its memory holds the association of the entitlement to access the film with an access criterion that represents the cost of the film. This cost may be expressed as a plurality of tokens. It then receives the data stream corresponding to this film and at least one control message that indicates the identifier. At this time it retrieves from memory the cost of accessing this film. It may then compare that cost with a token count indicating its remaining credit (access entitlement) and thus authorize or block access to the film. Here it should be noted that there may advantageously be provision for the cost of accessing a film to depend on the terminal, in particular to make promotional offers to esteemed customers.

Figure 4:
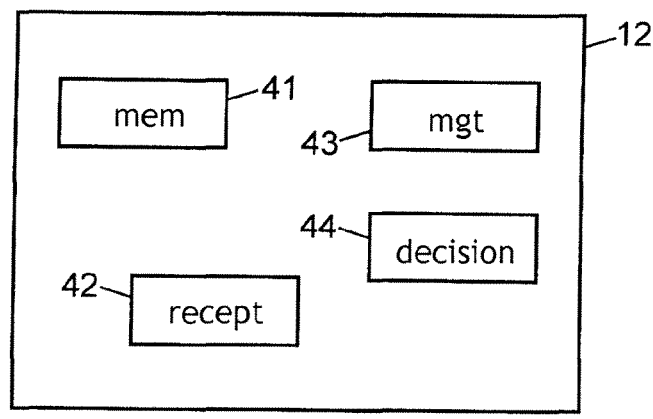
FIG. 4 shows a terminal one embodiment of the invention.

FIG. 4 shows a terminal of one embodiment of the invention. A terminal of this kind may include:
- a memory 41 adapted to store in association an identifier and at least one access criterion;
- a receiver unit 42 adapted to receive the data stream in association with a control message indicating said identifier;
- a memory management unit 43 adapted to retrieve the stored access criterion as a function of the identifier received in the control message; and
- a decision unit 44 adapted to verify whether the stored access criteria is satisfied and, where appropriate, to authorize access to the digital content received in the data stream.

Figure 5:
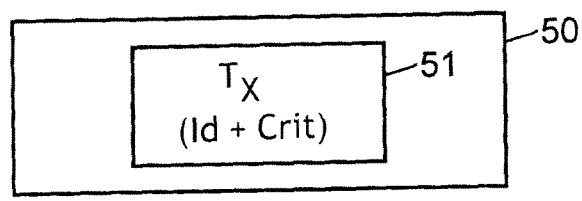
FIG. 5 shows an access control management entity of one embodiment of the invention.

FIG. 5 shows an access control management entity 50 of one embodiment of the invention. An access control management entity of this kind may include a transmission unit 51 adapted to transmit to the terminal an initial message indicating an identifier associated with said access criterion.

Figure 6:
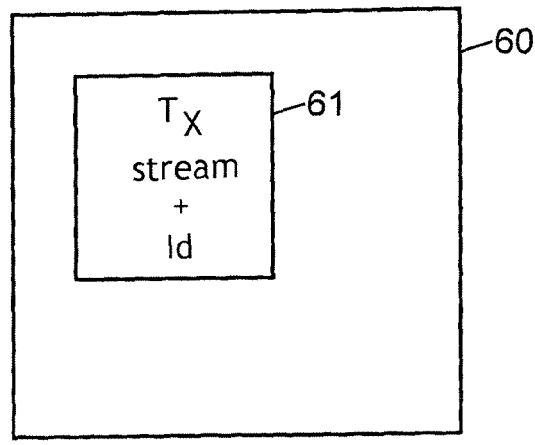
FIG. 6 shows a digital content transmission entity of one embodiment of the invention.

FIG. 6 shows a digital content transmission entity 60 one embodiment of the invention. A transmission entity of this kind may include a transmission unit 61 adapted to transmit a data stream corresponding to a digital content in association with at least one control message indicating said identifier.

In one embodiment of the invention, the terminal requires not only the control word (CW) or encryption key of the content received in a standard message of the ECM type but also an additional control word or encryption key that it may advantageously receive in a message of the EMM type transporting an identifier with associated access criteria, i.e., the initial message. Thus control may be made more secure.

It is also possible for the messages of the ECM type to transport access criteria in addition to an identifier. In this situation, the access criteria retrieved on the basis of the identifier may be combined with those received directly in the message of the ECM type.

Alternatively, the initial messages themselves may indicate identifiers that point to other criteria already stored in the terminal concerned. In this situation, control of access to a digital content may be based on a combination of access criteria received in the initial message and also stored access criteria pointed to in memory by the identifier or identifiers received in the initial message.

For example, in one embodiment of the invention there is provision to make access to a digital content dependent on a subscription 1 received in an initial message, for example, and a subscription 2 received in a general broadcast message of the ECM type associated with the data stream.

Only a few examples are explicitly described above. However, the features described above enable great flexibility in terms of offers and combinations of offers.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of various embodiments of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of managing control of access to at least one digital content as a function of at least one access entitlement and at least one access criterion, said digital content being transmitted to at least one terminal in the form of an encrypted data stream, wherein said access entitlement and said access criterion are previously stored in memory in the terminal, said access criterion being in association with an identifier, said identifier being a pointer to said access criterion, said method comprising the following steps executed in said terminal:
   a) receiving the encrypted data stream in association with a control message transmitting said identifier as provision for controlling access to the digital content;
   b) retrieving the previously stored access criterion as a function of the identifier received in the control message; and
   c) verifying whether the stored access entitlement enables decryption of the encrypted data stream and whether the retrieved access criterion is satisfied, in order, where appropriate, to authorize access to the content,
   wherein said identifier is the only provision for controlling access to the digital content received in association with the encrypted data stream.

2. The method of managing control of access according to claim 1, further comprising the following steps before the step (a):
   i) receiving an initial message transmitting at least the access criterion and the identifier associated with said access criterion; and
   ii) storing said access criterion in association with said identifier.

3. The method of managing control of access according to claim 1, wherein the control message further indicates an encryption key of said digital content.

4. The method of managing control of access according to claim 3, wherein the identifiers are transmitted synchronously with the data stream in messages of the Entitlement Control Message (ECM) type.

5. A non-transitory computer readable storage medium having a computer readable program code stored thereon, said computer readable program code implementing the method according to claim 1 when executed by a processor.

6. A terminal to access a digital content subject to access control management based on at least one access entitlement and at least one access criterion, said digital content being transmitted to at least one terminal in the form of an encrypted data stream, said terminal comprising:
- a memory to store in memory said access entitlement and an association between an identifier and said access criterion, said identifier being a pointer to said at least one access criterion;
- a receiver unit to receive the encrypted data stream in association with a control message transmitting said identifier as provision for controlling access to the digital content;
- a memory management unit to retrieve the stored access criterion as a function of the identifier received in the control message; and
- a decision unit to verify whether the stored access entitlement enables decryption of the encrypted data stream and whether the retrieved access criterion is satisfied and, where appropriate, to authorize access to the digital content received in the data stream, wherein said identifier is the only provision for controlling access to the digital content received in association with the encrypted data stream.

7. A system for controlling access to a digital content, comprising:
- an access control management entity comprising a transmission unit to transmit an initial message to at least one terminal according to claim 6, said initial message transmitting an association of an identifier and said access criterion;
- a digital content transmission entity comprising a transmission unit to transmit a data stream corresponding to the digital content in association with at least one control message transmitting said identifier; and
- at least one terminal according to claim 6.

* * * * *